United States Patent [19]

Thibault et al.

[11] Patent Number: 5,277,702

[45] Date of Patent: Jan. 11, 1994

[54] PLATEY ALUMINA

[75] Inventors: Theresa R. Thibault, Chicopee; Edward L. Glavin, Jr., Jefferson, both of Mass.

[73] Assignee: St. Gobain/Norton Industrial Ceramics Corp., Worcester, Mass.

[21] Appl. No.: 28,079

[22] Filed: Mar. 8, 1993

[51] Int. Cl.$^5$ .............................. C09C 1/68
[52] U.S. Cl. ........................... 51/309; 51/293; 423/625; 501/153
[58] Field of Search ............... 51/293, 309; 501/153; 423/625

[56] References Cited

U.S. PATENT DOCUMENTS

| | | | |
|---|---|---|---|
| 3,121,623 | 2/1964 | Nesin | 51/293 |
| 4,657,754 | 4/1987 | Bauer et al. | 423/625 |
| 4,820,498 | 4/1989 | Newkirk | 423/132 |
| 4,952,389 | 8/1990 | Szymanski et al. | 423/625 |
| 5,190,567 | 3/1993 | Tamamaki et al. | 51/293 |
| 5,196,180 | 3/1993 | Hartshorn | 423/593 |

Primary Examiner—Mark L. Bell
Assistant Examiner—Willie J. Thompson
Attorney, Agent, or Firm—David Bennett

[57] ABSTRACT

A novel platey alumina with essentially no aggregates, fines or fragments has been obtained. This product proves very advantageous in lapping substrate wafers for microelectronic applications. A process for making such products is also described.

10 Claims, 6 Drawing Sheets

PLATEY ALUMINA

BACKGROUND OF THE INVENTION

This invention relates to platey alumina, and particularly to platey alumina useful as a lapping powder.

"Lapping" is a finishing technique that is usually performed on a single or double sided lapping machine with abrasive provided in the form of loose particles suspended in a slurry and delivered to the surface of a part to be lapped. The part is held in carriers on or between lapping plates which are usually made of cast iron.

Properly executed lapping performs four functions:
1. It reduces a part to an accurate and uniform thickness;
2. It produces a part with essentially flat and parallel surfaces;
3. It removes surface and subsurface defects resulting from prior finishing operations such as sawing or cutting, providing these are not too deep; and
4. it performs the above functions while leaving minimum surface finish and depth of sub-surface damage.

The lapping process requires an abrasive that is of extreme uniformity in terms of particle size so as to avoid scratching the lapped surface. Over the years it has become a common practice to use platey alumina for this application.

Platey alumina is characterized by the shape of the particles which are comparable to hexagonal tiles. The individual particles have an aspect ratio, defined as the largest dimension divided by the smallest dimension, of at least about 10:1. The particle size is defined by standard measuring techniques such as by use of a Coulter Multisizer counter.

Platey alumina is produced commercially for example by Alcoa, (sold as P-25 alumina), and Lonza, (sold as MNY alumina) among others by the controlled calcination of alumina trihydrate. The product is often called "calcined alumina" and, as produced, conventionally contains significant quantities, (sometimes up to 100% of the weight of the powder), of agglomerates in which the platelets are strongly fused together. Clearly the use of such as-fired platey alumina as a lapping powder would be very inappropriate for the production of a high quality surface because the agglomerates would tend to scratch the surface and/or cause significant subsurface damage. Therefore manufacturers of lapping powders subject the platey alumina as purchased to prolonged milling, using non-metallic media, to break up the aggregates. The seminal patent in this field is U.S. Pat. No. 3,121,623 which sets forth the separation techniques that have become conventional. The product of this milling process is then subjected to hydraulic elutriation to obtain the final lapping powder.

The platey aluminas that are the subject of this invention are primarily of interest in lapping expensive materials such as silicon wafers. As indicated above, lapping is an essential step in the production of the substrates from which microchips are produced and the lapped wafer must be free from scratches and subsurface damage if the chips produced are to be useful. Scratches are defined as elongated gouges in the surface and are relatively easily detected by the microscope or even the unaided eye when they are particularly deep. They are commonly defined as those scratches that are visible to the naked eye after etching of the the surface. Subsurface damage, (SSD), is more difficult to detect and may comprise pitting or other surface cratering. It is not usually detectable until the lapped surface has been etched. The purpose of polishing is to remove SSD by removing surface material to a depth below the damage depth. This however must be kept to a minimum because the process is slow and primarily concerned with leaving a uniform flat surface without causing further SSD. In addition, since only one surface is polished at a time, there is a potential for leaving a surface that has diminished parallelism with the opposed surface.

The milling operation described in U.S. Pat. No. 3,121,623 takes several hours, (typically five to eight hours), to complete and results in a product in which the platelets are essentially completely separated but in which there are significant quantities of broken platelets. These can lead to SSD when used to lap and the best grades of platey alumina try to minimize their occurrence.

Another source of SSD is the presence of fines which tend to make the platelets lie unevenly such that one edge is raised. This can cause scratching of the lapped surface. The elutriation described in the above patent eliminates much, but not all, of the fines produced during the milling process.

As a response to the above, great efforts are made to reduce the amounts of fines in the best quality lapping powders. Broken platelets have not been easy to control and have largely been accepted as an unavoidable fact of life in a commercial process.

In a typical commercial process an as-fired, agglomerated platey alumina feed is wet milled in a Sweco mill for 5-8 hours till the desired $D_{50}$ size distribution is obtained and the mixture is then subjected to repeated decanting and settling operations to take out fines. The resulting slurry is then dried and pin-milled to break up any loose agglomerates formed during drying, classified, bagged and shipped. The operation takes from about 20 to 25 hours and results in a saleable yield of about 55% of the theoretical.

Such performance is clearly not very attractive from an economic standpoint. The yield is low and the time taken to achieve a quality saleable product is too long.

The present invention provides a way of obtaining a platey alumina lapping powder superior in quality to anything obtained before, using a process in which the time-in-process is very significantly reduced and the yield is significantly increased. The new product is also more uniform than any previously available platey alumina lapping powder, consists essentially of euhedral platelets and, when used in lapping silicon wafers, reduces the incidence of scratching and SSD to a level hitherto unknown.

DESCRIPTION OF THE INVENTION

The present invention provides a platey alumina lapping powder consisting essentially of individual platey alumina grains having diameters between 3 and 20 microns and essentially free from aggregates, fines or broken pieces of platey alumina particles, (fragments).

In the context of this invention it is understood that a lapping powder is considered essentially free of any aggregates or fragments if a scanning electron micrograph shows zero aggregates and less than five percent of any fragment particles in a field of view comprising at least one hundred platey alumina particles. Freedom from fines, as the term or its equivalent is used in this invention, relates to the tightness of the particle size distribution about the median value and is expressed in terms of the ratios of percentiles of particle sizes. The important percentiles are $D_3$, $D_{50}$, and $D_{94}$. The first is the particle size of the third percentile in terms of volume of the total population and expresses the length of the larger particle tail of the bell curve distribution. The second is the particle size of the fiftieth percentile, such that there is an equal volume of particles that are larger as there is of particles that are smaller. The third measures the length of the small particle tail and represents the particle size of the ninety-fourth percentile of the volume. Specifically, a lapping powder is considered to be "essentially free" from fines if the ratio of the third percentile particle size to that of the fiftieth percentile is less than 1.60 and the ratio of the particle size of the fiftieth percentile to that of the ninety-fourth percentile is not more than 1.45.

The product of the invention is also characterized by a bulk density that is considerably lower than that of the products of the prior art. The powders of the present invention have such a low percentage of fines and platelet fragments that typically fill the interstices between the platelets, (and thereby increase the measured bulk density), that the bulk density (dynamic) of a powder with a $D_{50}$ of 9 microns is less than about 1.35 g/cc, as measured using a Seshin bulk density meter, Model No. IH-2000. By contrast a typical bulk density for an excellent quality prior art powder of the same median particle size would be about 1.53 g/cc.

The present invention also provides a process for the production of a platey alumina lapping powder which comprises:

a. providing a platey alumina product containing from about 10 to about 30% by weight of aggregates;
b. classifying the platey alumina product into a coarse fraction and a fine fraction containing particles smaller than 6 microns;
c. wet milling the coarse fraction until the particle size of the powder has reached a $D_{50}$ of from about 7 to about 15; and
d. separating and removing a fraction with a particle size less than 3 and preferably less than about 6 microns.

The platey alumina product starting material can be obtained in any convenient way. A convenient way that allows the use of conventional commercial feeds of platey alumina, (which typically comprise about 90% aggregates and have a $D_{50}$ of about 50 microns), comprises subjecting the platey alumina to a light dry milling, (sometimes called "kiss-milling"). This achieves a partial break down of the aggregates without causing breakage of significant numbers of the platey alumina particles into fragments and is usually continued till a $D_{50}$ of about 9 microns is achieved.

The classifying operation removes any fines included with the platey alumina feedstock or generated during the light milling to reduce the aggregates content. This is a key feature of the present process because it has been found that the presence of the fines in the subsequent wet milling operation greatly prolongs the time needed to achieve removal of the aggregates and results in increased levels of fragments in the powder. The fines appear to act as a cushion, reducing the efficacy of milling impacts in breaking up the aggregates. Thus removal of these fines makes the milling more efficient, shortens the required milling time and reduces the generation of fragments.

A further advantage from the separation of fines at this stage is that the separated product is saleable for a number of applications. If the fines separation is left to the final screening, the particles are contaminated by any additives used to facilitate the grinding or to improve the lapping characteristics of the final product. It is commonplace for example to add sodium silicate to the product at the wet milling stage where the final lapping powder is intended to be used to lap silicon wafers. This silicate addition deposits a film of silica on the particles that may render them useless for conventional abrading purposes or other ceramic applications.

The fines removed after the milling are those produced during the wet milling. As indicated above this improves the lapping performance by allowing the platey alumina to assume the optimum lapping orientation with upper and lower surfaces essentially parallel to the lapping plate and to the surface being lapped.

DRAWINGS

FIG. 1, which is labelled "Prior Art", shows a scanning electron micrograph of a first quality platey alumina lapping powder according to the prior art. It will be noted that the powder comprises large numbers of platey particles of uniform size but also significant amounts of relatively fine particles and also of fragments of platey particles.

FIG. 2, which is a product according to the invention, is essentially free of fines or fragments and is made up of very uniformly sized, euhedral, platey particles.

FIGS. 3A, 3B, and 3C are charts showing the particle size distribution from typical prior art processes producing high quality products. They correspond to the products identified as a product similar to that shown in FIG. 1, (3A), the competitive Products identified A-15 and B-15 respectively in Table 1 below.

FIG. 4 shows the typical particle size distribution of a platey alumina lapping powder according to the invention. Both of FIGS. 3 and 4 were obtained using a Coulter Multisizer AccuComp counter.

DETAILED DESCRIPTION OF THE INVENTION

Figure 1:

The production of platey alumina with a reduced aggregate content from the commercially sold material by light dry milling, (kiss-milling), can be carried out in a ball mill or any other equivalent device in which the powder charged is subjected to moderate impacts. Such equipment is well known in the art and the design is not important providing it results in a reduction of the amount of agglomerates to less than about 30 weight percent, and preferably less than about 20 weight percent, based on the total charge in the mill, without causing fragmentation of the individual platey alumina particles. Often the end point of the kiss-milling is determined by the desired $D_{50}$, (usually about 9 microns), of the product to be used in the process.

The classification operation can be performed in any suitable device but since the powder is at this stage dry, it is often convenient to use an air classifier of any suitable design to remove fines from the kiss-milled product. At this stage essentially all of the particles with sizes less than 3 microns are removed. In a particularly preferred embodiment essentially all particles with sizes less than 6 microns are removed. Typical air classifiers that can be used in this operation include the MS5 machine sold by Progressive Industries, of Sylacauga, Ala. and the G25 machine sold by Georgia Marble of Tate, Ga. It is often desirable to provide that the internal surfaces of the classifier are protected by a coating, for example a polyurethane coating, such that metallic contamination of the product is avoided.

The wet milling is conveniently carried out in a Sweco mill using ceramic media. The end point is determined by the $D_{50}$, (or number average particle size), of the desired powder. Usually a $D_{50}$ of from about 6 to about 12 microns, and more preferably from about 7 to about 10 microns, is preferred. The time to reach this level depends on the characteristics of the powder charge. However because of the use of a reduced-aggregates feed stock, (by a kiss-milling or equivalent operation), and the removal of the fines, the wet milling stage can be reduced to about 10% or less of the time taken if the fines are not removed.

During the wet milling it is convenient to add a small amount of a soluble silicate such as sodium silicate. This acts to facilitate the milling and is also advantageous in the final lapping powder when used to lap, for example, silicon wafers. The amount is sufficient to provide a coating on the alumina particles and the amount required for this purpose is very small. For example a charge of about 200 gallons of a 50% solids platey alumina slurry requires about 11 pounds of a 33% sodium silicate solution. Even here it is believed that much of the silicate stays in the solution and is thrown out with the water when the powder is separated.

After the milling the slurry of platey alumina is preferably passed from the mill to a decant tank where the heavier particles settle to the bottom and the finer stay dispersed in the water. Other separation techniques could of course be used but settling is convenient, inexpensive and effective to produce the desired result. At this point it is usually convenient to screen the slurry to remove any residual aggregates and any chips from the milling media broken off during the milling. This can be done between the decant tank where the milled slurry is initially deposited, and the subsequent settling tank. It is often desirable to add a flocculant such as alum to the settling tank to accelerate the settling process. The amount is usually enough to reduce the pH to about 6 or lower. After the removal of the water it is preferred to pass the residue, after decanting the water layer, into a treat tank in which sodium silicate is added back to replace silicate removed by the alum during settling in the previous settling tank and to restore the pH to a level of about 9.

In a preferred embodiment of the process of the invention, a roughly 70% solids slurry is removed from the treat tank and dried. The drying can be achieved in any suitable way such as spray drying, air jet drying, hot air circulation through a bed or simply by placing trays of the slurry in an oven for a number of hours. Where the drying leads to the creation of loose agglomerates, (as is the case in oven drying for example), these must be broken up before the product is finally screened. This can be done in any convenient fashion but the usual expedient involves the use of a pin mill.

Suitable machines are made by the Entoleter and Alpine companies.

The de-agglomerated powder is then classified, (preferably using an air classifier), to the desired particle size range. At the same time a fines cut is removed such that the final product has a very tight particle size distribution, typically about 90% of the particles having a particle size between about 6 and 12 microns, and is essentially free of fragments.

Analysis of the particle size distribution of a number of commercial products indicates how unusual this tight particle size distribution has proved to be. These are shown in the following Table wherein the Applicant's products according to the invention, Norton-9, 12 & 15, are compared with the similar grades of lapping powders from competitors A, B and C. A significant key is the fines content. It is relatively easy to produce a relatively fines free product at larger median particle sizes by setting the fines cut at a higher particle size. Such powders perform well but do not give the finish of a finer median size product. However removal of fines at finer target median particle sizes is not so easy without significant loss of yield because of the width of the typical bell curve distribution of particle sizes for prior art products. It will be seen however that the $D_{50}/D_{94}$ ratio for the products of the invention, which indicates the length of the fines tail, is much lower than has been previously obtained, (with increased yield!). This much shorter fines tail in the product, gives the opportunity for improved performance in terms of freedom from subsurface damage, even at low median particle sizes.

TABLE 1

| RATIO | NORTON | | | A | | | B | | | C | | |
|---|---|---|---|---|---|---|---|---|---|---|---|---|
| | 9 | 12 | 15 | 9 | 12 | 15 | 9 | 12 | 15 | 9 | 12 | 15 |
| $D_3/D_{50}$ | 1.57 | 1.51 | 1.48 | 2.00 | 2.02 | 1.95 | 1.61 | 1.74 | 1.65 | — | 1.75 | — |
| $D_{50}/D_{94}$ | 1.38 | 1.36 | 1.29 | 1.62 | 1.66 | 1.57 | 1.74 | 1.61 | 1.64 | — | 1.54 | — |

The numbers 9, 12 and 15 indicate products of increasing median particle size. While the definitions of these grades for each competitor are not the same, the trend towards tighter particle size distribution with larger median particle sizes for the products of the invention is clear. All measurements were made on the Coulter counter described above except for the data on Competitor A, which were taken from its product literature.

Unlike the prior art processes, the usable yield of lapping powder from the process of the invention can be as high as 75% or more depending on the required particle size specification for the product.

DESCRIPTION OF SPECIFIC EMBODIMENTS

The invention is now described with reference to the following examples which are for purpose of illustration only and are not intended to imply any necessary limitation on the essential scope of the invention.

EXAMPLE 1

A lightly milled MNY platey alumina obtained from Lonza AG having an aggregates content of about 20% by weight and a $D_{50}$ of about 9 microns was classified in a Progressive Industries MS5 air classifier to screen out essentially all particles with a particle size of 3 microns or less. The coarse fraction, (1100 pounds), was then charged into a Sweco mill containing about 200 gallons of water and 11 pounds of 33% by weight sodium silicate, ($SiO_2$ to Na ratio is about 3.2:1). The charge was then wet milled using alpha alumina media for about 25 minutes, at which point the $D_{50}$ was 9 microns. (The removal of the fines displaced the $D_{50}$ of the remaining fraction of the kiss-milled feedstock to a larger particle size).

The slurry from the Sweco mill was then discharged as a 5% solids slurry into a decant tank and was allowed to settle for 4 hours. The water layer containing at least a portion of the fines generated during the milling was decanted and the remainder was passed through a 325 mesh sieve, to take out any residual aggregates as well as any chips broken from the media during milling, into a settling tank containing 1000 gallons of water. The pH of the slurry was adjusted to about 5.6 or lower by addition of alum and the slurry was allowed to sit for about 6 hours. This encouraged flocculation of the platey alumina particles which then settled to the bottom. The aqueous layer was then taken off and the residual slurry was dumped into a 200 gallon treat tank containing water, in which the pH was adjusted to about 9 by addition of sodium silicate. This replaced the sodium silicate removed in solution along with the alum in the previous tank. After 6 hours in this tank a 70% solids slurry was discharged into a series of pans which were placed in an air circulating oven until essentially all the water had been removed.

The dried powder was then placed in an Entoleter pin mill to break up the loose aggregates. The resulting powder was then classified in a Progressive Industries MS5 air classifier to remove all particles with a size smaller than 6 microns.

Figure 2:

The amount of product obtained represented about 80% of the theoretical yield based on the amount of lightly milled platey alumina used as the starting material. Of the rest about 10% was marginally useful and only 10% was unusable. When used to lap silicon wafers, this powder produced essentially no scratching or subsurface damage. Its appearance under a scanning electron microscope is shown in FIG. 2. This shows substantially no broken platelets.

By contrast a product made by essentially the same process except for the elimination of the classification prior to wet milling required 5 to 8 hours to reach the same particle size, and yielded about 45% of non-saleable product, (based on the theoretical yield calculated on the same basis). In use to lap silicon wafers, the prior art product was essentially non-scratching but showed some tendency to cause minor subsurface damage as a result of the presence of fragments of platelets. The appearance of this product under an scanning electron microscope is shown in FIG. 1.

Figure 3A:
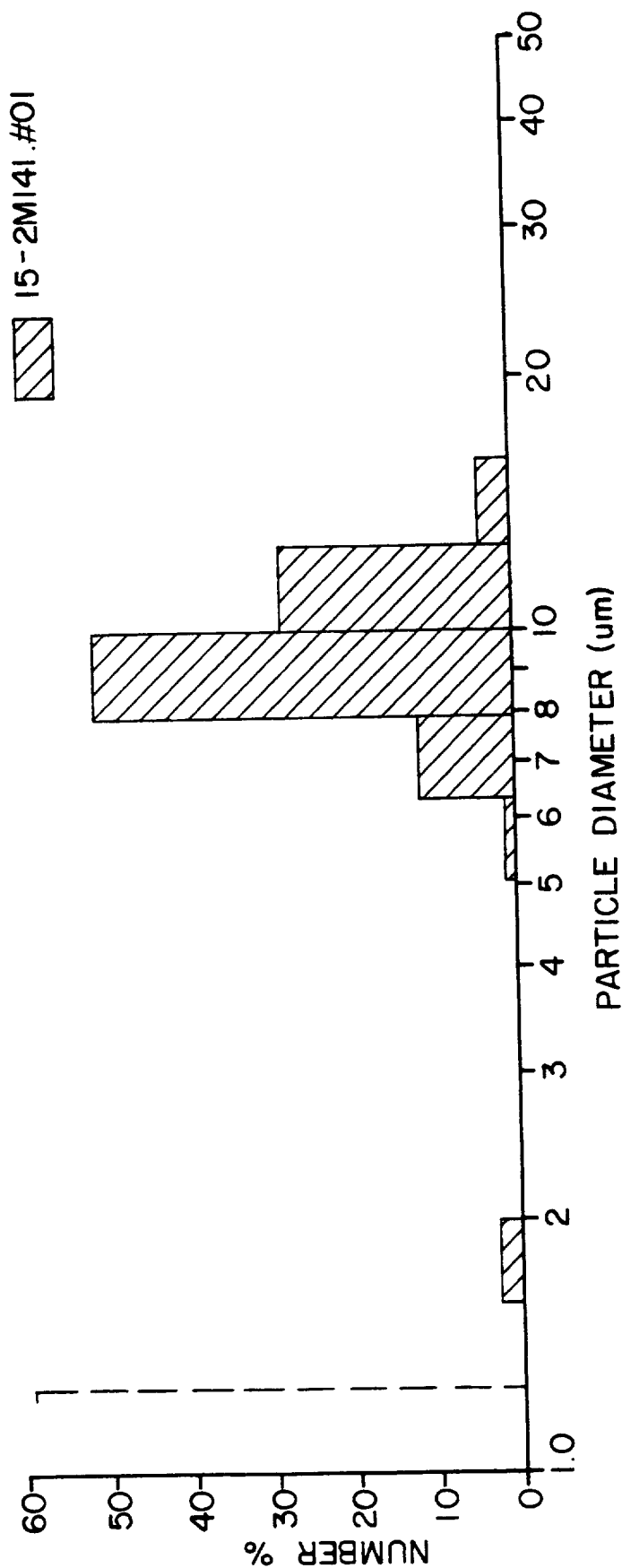
Figure 3B:
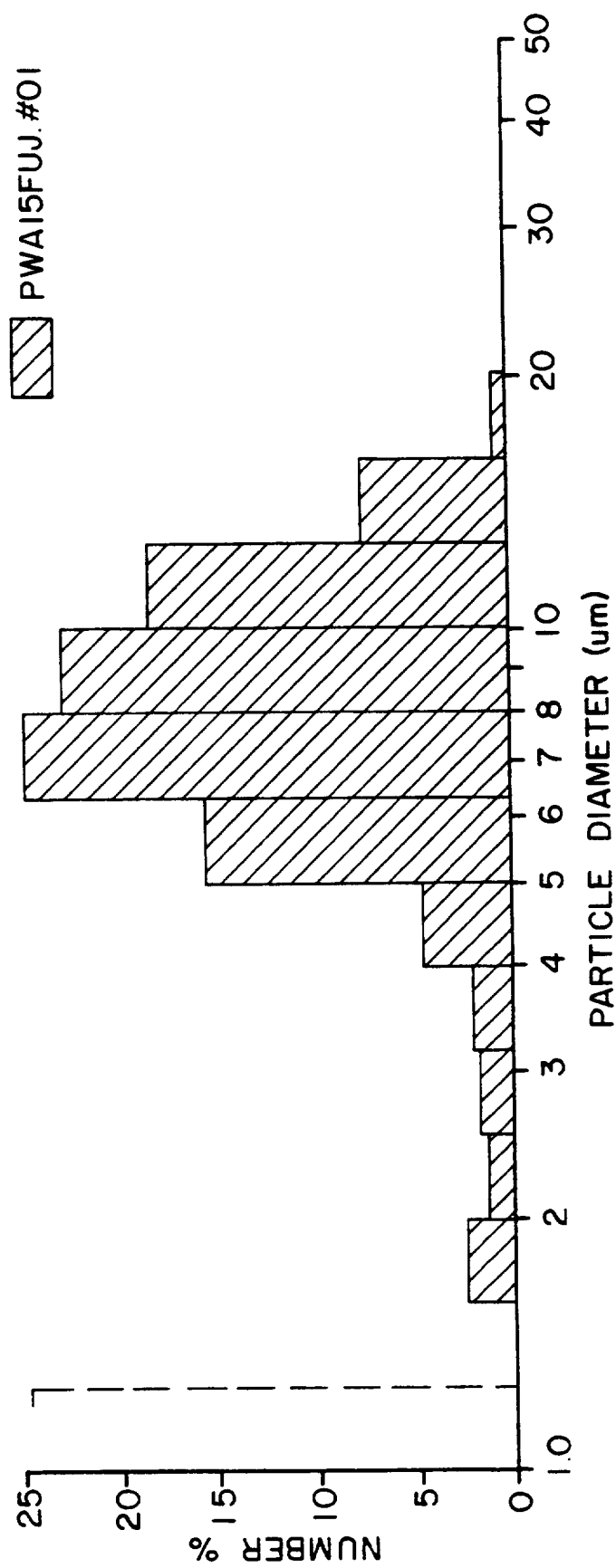
Figure 3C:
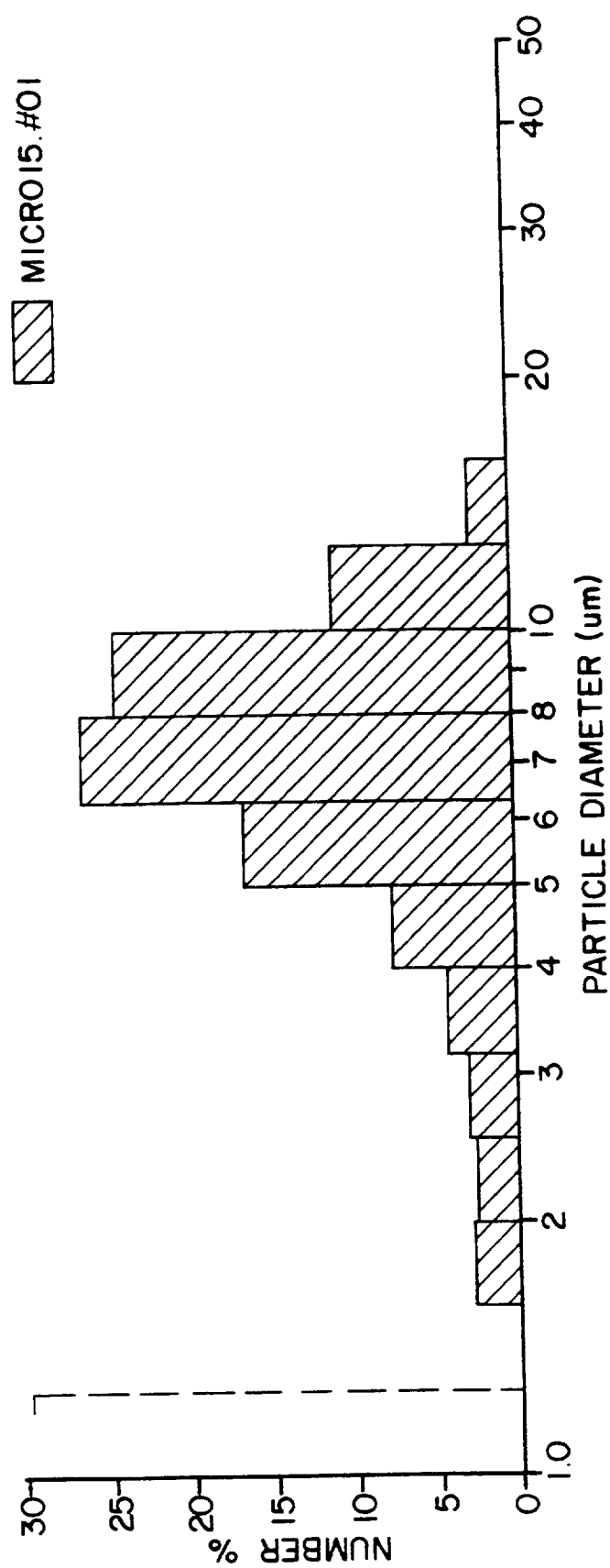
Figure 4:
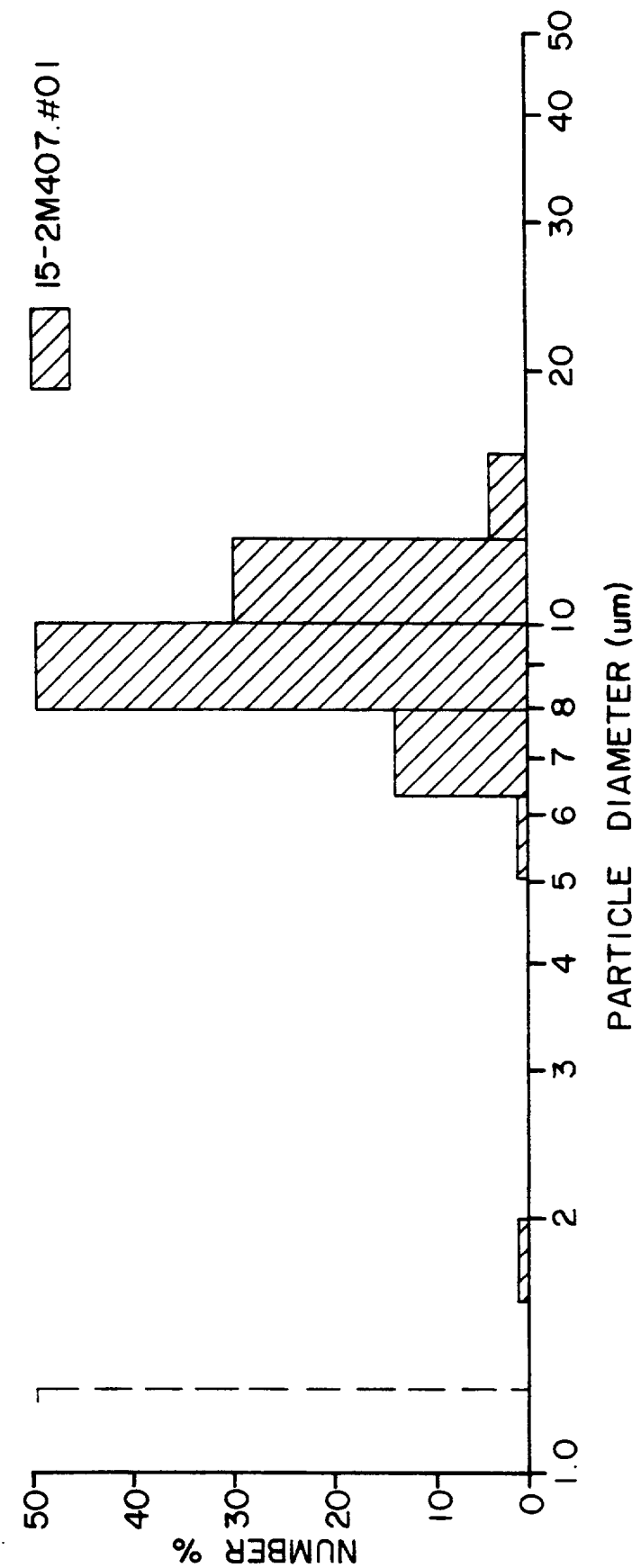

The particles in the powders according to the invention are almost exclusively unbroken, euhedral, platey alumina particles of very uniform size. The particle size distribution, as measured using a Multisize AccuComp (Trade Mark of Coulter) from Coulter Corporation is shown in FIG. 4. The particle size distribution of an excellent prior art product of the kind shown in FIG. 1, measured using the same equipment, is shown in FIG. 3A.

The lapping performance of various products, defined by their $D_{50}$, was determined. The product of the invention was compared with that of a high quality commercial product made by the prior art process described above and the comparison was on the basis of the depth to which the wafers had to be polished to remove SSD. (Neither showed any signs of scratching).

TABLE 2

| $D_{50}$ | Invention | Prior Art |
|---|---|---|
| 10.5 | 14/15 | 18/19 |
| 8.9 | 11/12 | 14/15 |
| 8.0 | 11 | 13/14 |
| 7.1 | 8 | 11/12 |
| 6.6 | 9/10 | 10 |

In carrying out the process a lapping slurry comprising 150 g/liter of the powder was made up in 3 liters of deionized water and 3.5% of HTS vehicle, (dispersant) was added. The lapping machine used was a PW AC500 lapping machine with 455 mm diameter flat cast iron plates. The wheel was driven at 67 rpm and the center drive rotated at 30 rpm. Lapping mixture was fed to the surfaces to be lapped at a rate of 30 ml/min. The plates were checked to ensure the flatness, (less than 13 microns concavity out of flatness allowed), and truing rings were run, with the slurry flowing, for 10 minutes.

Wafers to be lapped were chosen to be within 10 microns of one another in thickness. Each had been edge ground, (n100 orientation), and was 100 mm. in diameter. Three loads of five wafers each were lapped at 200 g/cm$^2$ to remove a minimum of 75 microns thickness.

Each wafer was then etched in a tank containing 45% potassium hydroxide at 100° C. for five minutes, which removed about 25 microns of thickness. The etched wafers were then quenched in cold water, dried and inspected in strong fluorescent light. Any after-etch scratches were grounds for rejection.

SSD was measured by polishing each wafer individually on a modified Strasbough polisher using a SUBA 500 pad and potassium hydroxide-modified diluted colloidal silica, (Nalco 2350), at a pH of 10.5. A polishing pressure of 570 g/cm$^2$ was used. The wafers were cleaned and polished and then observed using a Nemarsk equipped microscope until the last pit is removed. Polishing is controlled to record the point of last pit removal within 0.5 micron. SSD is recorded as a range of thickness, (in microns), that had to be removed to eliminate SSD. For the lapping material chosen the maximum allowed was 16 microns.

This indicates clearly that the products of the present invention outperform the best prior art products while being produced faster and with a greater yield.

Applications of the lapping powders of the present invention extend beyond lapping silicon wafers prior to etching and polishing for microelectronic applications. They can also be used to lap other ceramics and glass surfaces for optical telescopes and the like.

What is claimed is:

1. Platey alumina powder consisting essentially of individual euhedral platey alumina grains having diameters between 3 and 20 microns which has a $D_{50}/D_{94}$ less than 1.45 and a $D_3/D_{50}$ less than 1.6 and contains less than 5% of fragments of platey alumina particles.

2. Platey alumina powder according to claim 1 in which the $D_{50}/D_{94}$ ratio is less than 1.4.

3. Platey alumina powder according to claim 1 in which at least 90% of the particles have sizes between 6 and 12 microns.

4. Platey alumina powder with a $D_{50}$ of 9 microns and no particles larger than 12 microns, having a bulk density of less than 1.35 g/cc.

5. Platey alumina powder consisting essentially of individual, euhedral, platey alumina particles having a $D_{50}$ between 6 and 12 microns, a $D_3/D_{50}$ of less than 1.6, a $D_{50}/D_{94}$ of less than 1.4, which is essentially free of fines and aggregates and which contains less than 5% of fragments of such platey alumina particles.

6. A process for the production of a platey alumina lapping powder which comprises:
   a. providing a platey alumina product containing from about 10 to about 30% by weight of aggregates;
   b. classifying the platey alumina product into a coarse fraction and a fine fraction containing particles smaller than 6 microns;
   c. wet milling the coarse fraction until the particle size of the powder has reached a $D_{50}$ of from about 6 to about 12; and
   d. separating and removing a fraction with particle sizes less than 3 microns.

7. A process according to claim 6 in which the aggregate-containing platey alumina is obtained by lightly dry milling an as-produced, calcined, platey alumina product till the percentage of aggregates has been reduced.

8. A process according to claim 6 in which, after the wet-milling operation, particles smaller than 6 microns are removed.

9. A process according to claim 6 in which, after the wet-milling, at least part of the fines are separated in an operation in which the slurry of alumina in water discharged from the wet milling operation is allowed to settle to form a water layer and a slurry layer, and a fines component is removed with the water layer.

10. A process according to claim 9 in which the fines separation after the wet-milling also includes air-classification after the milled slurry has been separated, dried and lightly milled to break up any loose aggregates formed during drying.

* * * * *